June 20, 1950           A. W. MILLER           2,512,501
TURNBUCKLE
Filed June 10, 1947
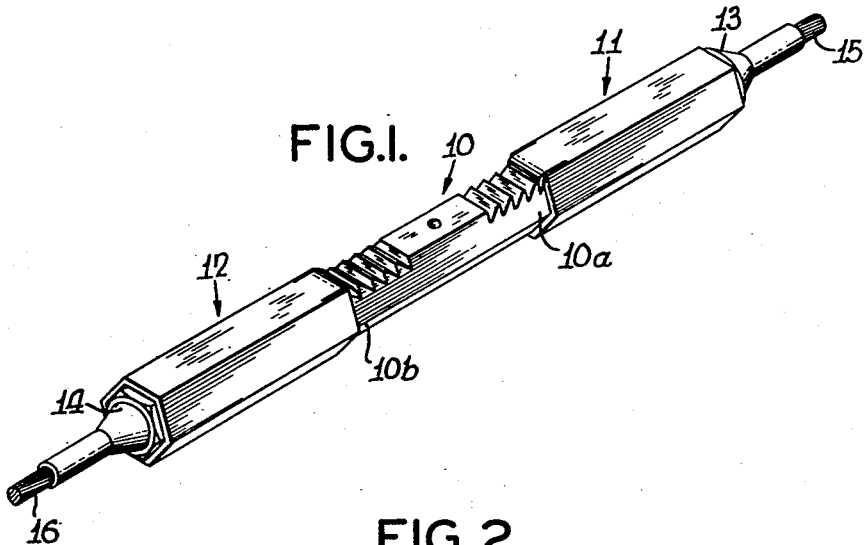
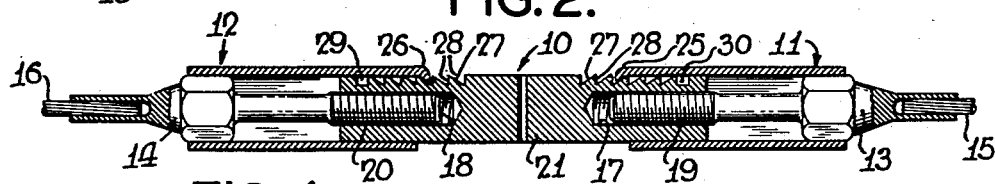
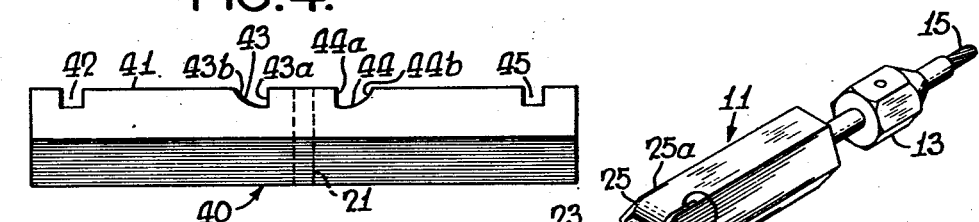
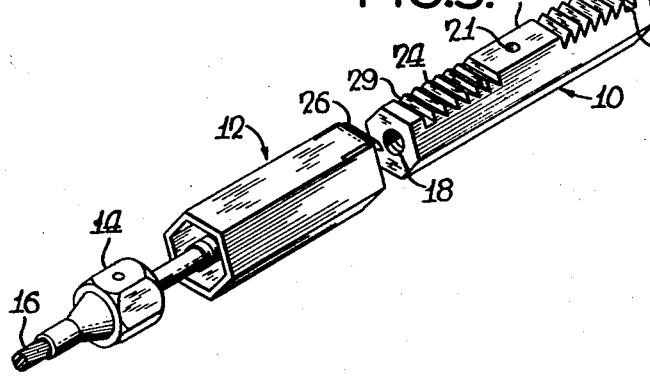
INVENTOR
ARTHUR W. MILLER
BY
Blair, Curtis & Hayward
ATTORNEYS Patented June 20, 1950

2,512,501

UNITED STATES PATENT OFFICE 2,512,501

TURNBUCKLE

Arthur W. Miller, Princeton, N. J.

Application June 10, 1947, Serial No. 753,667

9 Claims. (Cl. 287—60)

1

This invention relates to turnbuckles, and more particularly to a self-locking turnbuckle adapted for connection with airplane control cables to adjust the tension therof.

It is well known that the control cables of an airplane, boat or other vehicle operate under conditions given rise to substantial torsional and tensile stresses during the course of normal operation. Such control cables, particularly in airplanes, have been equipped with the so-called standard "AN" turnbuckle assembly, which assembly, however, is objectionable in certain respects. Thus such assemblies are usually characterized by safety wires which are used to lock together relatively movable parts by which adjustment is effected, but these safety wires occasionally are sheared when subjected to extraordinary stresses. Furthermore, these standard turnbuckle assemblies are incapable of being rapidly connected or disconnected, frequently have sharp edges having a tendency to cut the safety wire, and frequently after assembly leave the ends of the safety wire so exposed as possibly to result in injury to a mechanic.

Various types of self-locking turnbuckles have been proposed, but these are also characterized by certain objectionable features. This some of them are of such a nature as to preclude easy inspection after installation. Others necessitate the provision of special tools to effect desired adjustments while still others are characterized by structural complexities that preclude their interchangeable use with standard "AN" turnbuckle assemblies.

It is accordingly among the objects of my invention to provide a self-locking turnbuckle assembly which is simple and inexpensive in construction, readily applicable and thoroughly dependable in use, and which overcomes the several objectionable features noted hereinbefore. Other objects will be in part apparent and in part pointed out hereinafter.

In accordance with one form of my invention, the assembly comprises a male connection member adapted to slidably receive on its opposite ends female sleeve fittings which, together with the connection member, are polygonal in cross-section so as to interlock against relative rotation. The assembly also includes terminal fittings which may be similar to the conventional swaged cable end fittings. The male and female fittings or elements are provided with interlocking formations of such a nature as to detachably lock the sleeves in place on the connection member in their relative adjusted positions.

2

In the drawing, wherein I have shown one form of my turnbuckle assembly,

Figure 1 is a perspective view of the assembly attached to cable ends in self-locking position;

Figure 2 is a sectional elevation of the assembly;

Figure 3 is another perspective view of the assembly in disassembled condition; and, Figure 4 is an enlarged side view of a modified form of one part of the connection member of the turnbuckle assembly.

Similar reference characters refer to similar parts throughout the views of the drawing.

Referring first to Figure 1, the assembly includes a male connection member generally indicated at 10, which is polygonal in cross section and is adapted to slidably receive over its ends 10a and 10b female fittings, generally indicated at 11 and 12, respectively. Fittings 11 and 12 are also polygonal in cross-section, and accordingly may slidably engage respectively terminal fittings 13 and 14, to which cable ends 15 and 16 are connected in any suitable manner. Thus it may be seen that when the female fittings 11 and 12 are in their adjusted Figure 1 position, relative movement between connection member 10, on the one hand, and terminals 13 and 14, on the other hand, is precluded, to prevent unlocking of the assembly.

As shown in Figure 2, connection member 10 has its ends axially drilled and threaded as at 17 and 18 to threadably receive the exteriorly threaded shanks or ends 19 and 20, respectively, of terminals 13 and 14. A hole 21 extends through the center portion of connection member 10 for the reception of a pin or other tool by which connection 10 may be rotated relative to terminals 13 and 14 in one direction or another, thereby to adjust the distance therebetween and accordingly adjust the tension of the cable.

One side, e. g. side 22 (Figure 3) of connection member 10, is provided with two sets 23 and 24 of locking teeth which are adapted respectively to cooperate with a resilient finger 25 on fitting 11, and a resilient finger 26 on fitting 12. Preferably the ends of these fingers project beyond the ends of their respective fittings and are formed and attain their resilience by slotting the fittings as at 25a and 25b in fitting 11. If desired, however, each finger may comprise an element separate from its fitting but attached thereto in any suitable manner as, for example, by spot welding. With fingers 25 and 26 formed as shown, however, the locking condition of sleeves 11 and 12 may be readily inspected and checked, i e. it is only necessary to apply a straight edge to the sleeve face from which the resilient finger is cut and if the finger has taken an outward set beyond a predetermined tolerance limit, the finger can be adjusted or the sleeve discarded, as desired.

As is better shown in Figure 2, each of the locking teeth on connection member 10 has an inclined face 27 and a vertical face 28, the faces 27 on tooth set 24 being inclined oppositely to faces 27 on tooth set 23. At the end of tooth set 24 (Figure 3) is a vertical sided groove 29, a similar groove 30 being provided at the extreme end of tooth set 23, these grooves being of sufficient depth to receive and lock the ends of fingers 26 and 25 and thus prevent the female fittings 11 and 12 from slipping off connection member 10 through inadvertence. Resilient fingers 24 and 25 may, of course, be forcibly lifted out of the grooves to permit removal of the fittings.

Preferably fittings 11 and 12 are so proportioned relative to connection member 10 that the combined lengths of fittings 11 and 12 approximate the over-all length of connection member 10. Thus the two female fittings may be slid toward one another over connection member 10 until the opposed edges of the fittings almost abut, thus freeing terminals 13 and 14. With the terminals thus free of the sleeve fittings, a pin may be inserted in hole 21 of connection member 10, and the connection member rotated to effect relative movement between terminals 13 and 14 in one direction or another as desired, thus to attain the cable tension desired, or indeed, to effect disconnection of the turnbuckle assembly from the cable terminals. When the desired tension is attained, it is then but a simple matter to slide the female fittings 11 and 12 outwardly of connection member 10 and engage them respectively with terminals 13 and 14, thus locking the terminals against rotation relative to connection member 10 and accordingly relative to one another. By providing a plurality of locking teeth on connection member 10, each of the female fittings may be positioned as desired relative to terminals 13 and 14. Furthermore, as these locking teeth have inclined faces 27 which slope in the directions indicated, locking movement of the female fittings relative to terminals 13 and 14 is readily effected, unlocking movement thereof relative to the fittings being possible only by forcible withdrawal of fitting fingers 25 and 26 from tooth sets 23 and 24, respectively, as by a special tool. Inadvertent unlocking movement of fittings 11 and 12 relative to terminals 13 and 14 is precluded by virtue of the provision of vertical tooth faces 28 which prevent easy movement of fittings 11 and 12 off connection member 10. Also by reason of the provision of a plurality of teeth in each of sets 23 and 24, there is no critical locking position for either of fittings 11 or 12.

In many instances I have found that it is unnecessary to provide the plurality of teeth 23 and 24, and accordingly a modified form of connection member, which is generally indicated at 40 in Figure 4, may be used. Thus connection member 40, which is polygonal in cross-section, has a face 41 in which are cut transverse slots or grooves 42, 43, 44 and 45. Grooves 42 and 45 are located adjacent the ends of the connection member and have opposed vertical sides, thus resembling grooves 29 and 30 of connection member 10 (Figure 2) in location, conformation and function. Grooves 43 and 44, however, have respectively vertical faces 43a and 44a and inclined faces 43b and 44b. Each of these grooves 42—45 is sufficiently deep to accommodate the ends of resilient fingers 25 and 26 of the sleeves 11 and 12, the vertical sides of the grooves providing a positive lock in each instance. However, by reason of the inclusion of groove sides 43b and 44b, relatively effortless release of the resilient fingers from grooves 43 and 44 is made possible.

It may now be seen that grooves 43 and 44 may receive resilient fingers 26 and 25, respectively, of sleeves 12 and 11, when it is desired to hold these sleeves in the position wherein terminals 14 and 13 are freed. With the sleeves in this position, a lever pin may then be inserted in hole 21 of connection member 40, and the connection member may be rotated to adjust the cable tension. By the provision of vertical faces 43a and 44a of grooves 43 and 44, movement of either of the sleeves over hole 21 is precluded, this hole accordingly always remaining accessible for the reception of a lever pin.

After the cable tension has been adjusted, it is an easy matter to slide the sleeves axially of connection member 40 until the ends of the resilient fingers become lodged in grooves 42 and 45, the inclusion of faces 43b and 44b of grooves 43 and 44 greatly facilitating this operation. It follows that with the resilient sleeve fingers lodged, and indeed locked in grooves 42 and 45, the heads of terminals 13 and 14 are respectively covered by the sleeve ends regardless of the position of the terminal heads relative to connection member 40, as long as the threaded shanks 19 and 20 of the terminals threadably enage the connection member, i. e. sleeves 11 and 12 and connection member 40 are so proportioned that this condition results.

Inasmuch as airplane use of a turnbuckle assembly of this nature entails rigid inspection requirements, it follows that the provision of the two female fittings 11 and 12 greatly facilitates inspection, as either fitting may be inspected independently of the other internally or externally, thereby making it but a simple matter to check the resilient fingers 25 and 26 of the fittings for wear or displacement. Also, in view of the fact that many cable installations are originally equipped with standard "AN" turnbuckle assemblies which are characterized by terminals similar to terminals 13 and 14, the other cooperating portions of the standard turnbuckle assembly may be readily replaced by my assembly, as the several parts of my assembly are designed with approximately the same length dimensions as standard "AN" turnbuckle parts. Therefore, any one or more of the parts of my assembly may be used with the standard "AN" assembly parts, providing safety wire is used for preventing relative movement therebetween. It should be noted, however, that my sleeves 11 and 12 would not be used where a standard connection member was included as part of the assembly.

Accordingly, it may be seen that I have provided a self-locking turnbuckle assembly which attains the several objects set forth hereinabove in a thoroughly practical and efficient manner.

As many possible embodiments may be made of the above invention, and as many changes might be made in the embodiment above set forth, it is to be understood that all matter hereinbefore set forth or shown in the accompanying drawing is to be interpreted as illustrative and not in a limiting sense.

I claim:

prising, in combination, a pair of elongated female fittings having polygonal cross-sections and adapted to slidably engage the terminal fittings of a cable, said terminal fittings including elongated oppositely threaded shanks, an adjustment member having coaxial oppositely threaded holes in its opposite ends, said threaded holes adapted to be threadably attached to said threaded shanks and rotatable relative thereto to adjust the distance therebetween when the shanks and said member are connected, said member also being polygonal in cross section throughout its length and adapted to have its ends slidably received in the juxtaposed ends of said female fittings, and interlocking formations on said female fittings and on said member for precluding relative axial movement between said female fittings and said member.

2. An assembly according to claim 1, wherein said interlocking formations include a plurality of rigid teeth on said member, and a resilient finger on each of said female fittings engageable with said rigid teeth.

3. A self-locking turnbuckle assembly comprising, in combination, a pair of terminal fittings adapted to be attached to the connectable ends of a flexible cable, said terminal fittings having axially extending oppositely threaded elongated shanks, an adjustment member having oppositely threaded outwardly opening holes adapted to threadably engage respectively said shanks, a pair of sleeves longitudinally slidable over said terminal fittings and said adjustment member, said sleeves having portions of non-circular cross-section and said terminal fittings and said adjustment member having elongated portions of non-circular cross-section on their slidable surfaces cooperating with said sleeve portions respectively to prevent relative rotation with respect to said sleeves and consequently to each other, and locking means on said sleeves and on said adjustment member for releasably locking said sleeves against axial movement relative to said member in any one of a plurality of adjusted positions.

4. An assembly according to claim 3 wherein said locking means includes a resilient locking finger at one end of each of said sleeves and said adjusting member includes a plurality of formations adapted to cooperate with said resilient fingers to hold said sleeves in any of a plurality of adjusted positions relative to said adjusting member.

5. An assembly according to claim 3 wherein the axial length of each of said sleeves approximates one-half the over-all length of said adjusting member.

6. An assembly according to claim 3 wherein said locking means comprise interlocking formations on said sleeves and member for precluding relative axial movement between said sleeves and said member, the formations on said sleeves comprising resilient fingers whose top surfaces are respectively coplanar with respective surfaces of said sleeves.

7. An assembly according to claim 3, wherein said locking means comprise a plurality of transverse slots cut in said member, the outermost slots having vertical locking faces while the innermost slots have oppositely inclined faces slanting toward the ends of said member, said locking means further including a resilient locking finger at one end of each of said sleeves for locking engagement with said outermost slots and releasable upon engagement with said innermost slots.

8. An assembly according to claim 1, wherein said interlocking formations include a plurality of rigid teeth on said member, and a resilient finger on each of said female fittings engageable with said rigid teeth, each of said rigid teeth having an inclined face and a substantially vertical face, said inclined faces inclining in the direction of detaching movement of the fittings.

9. An assembly according to claim 3, wherein said locking means includes a resilient locking finger at one end of each of said sleeves, and said adjusting member is provided at each end with a transverse slot, said transverse slots adapted respectively to receive said resilient locking fingers when said sleeves are moving outwardly and axially of said adjusting member to prevent said sleeves from sliding off the respective ends of said member.

ARTHUR W. MILLER.

REFERENCES CITED

The following references are of record in the file of this patent:

UNITED STATES PATENTS

| Number | Name | Date |
| --- | --- | --- |
| 768,452 | Hennessy | Aug. 23, 1904 |
| 1,343,279 | Reynolds | June 15, 1920 |
| 1,391,495 | Parsons | Sept. 20, 1921 |
| 2,295,357 | Ryan et al. | Sept. 8, 1942 |

Certificate of Correction

Patent No. 2,512,501                                     June 20, 1950

ARTHUR W. MILLER

It is hereby certified that error appears in the printed specification of the above numbered patent requiring correction as follows:

Column 4, line 34, for "enage" read *engage*; column 5, line 51, for the word "hold" read *releasably lock*;

and that the said Letters Patent should be read as corrected above, so that the same may conform to the record of the case in the Patent Office.

Signed and sealed this 8th day of May, A. D. 1951.

[SEAL]

THOMAS F. MURPHY,
*Assistant Commissioner of Patents.*